United States Patent
Kothari

(10) Patent No.: US 8,745,724 B2
(45) Date of Patent: Jun. 3, 2014

(54) METHODS OF ON-CHIP MEMORY PARTITIONING AND SECURE ACCESS VIOLATION CHECKING IN A SYSTEM-ON-CHIP

(75) Inventor: Love Kothari, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/341,787

(22) Filed: Dec. 30, 2011

(65) Prior Publication Data

US 2013/0047250 A1    Feb. 21, 2013

Related U.S. Application Data

(60) Provisional application No. 61/524,538, filed on Aug. 17, 2011.

(51) Int. Cl.

| | |
|---|---|
| *G06F 21/44* | (2013.01) |
| *G06F 1/32* | (2006.01) |
| *G06F 12/14* | (2006.01) |
| *H03K 3/03* | (2006.01) |
| *H03K 3/037* | (2006.01) |
| *H03K 5/13* | (2014.01) |
| *H03K 5/00* | (2006.01) |

(52) U.S. Cl.
CPC *G06F 21/44* (2013.01); *G06F 1/32* (2013.01); *G06F 12/14* (2013.01); *H03K 3/0315* (2013.01); *H03K 3/0375* (2013.01); *H03K 5/132* (2013.01); *H03K 2005/00026* (2013.01); *H03K 2005/00058* (2013.01)
USPC ............................................................ 726/16

(58) Field of Classification Search
CPC ............ G06F 1/32; G06F 21/44; G06F 12/14
USPC ............................................................ 726/16
See application file for complete search history.

(56) References Cited

U.S. PATENT DOCUMENTS

| | | | | |
|---|---|---|---|---|
| 4,882,752 | A | * | 11/1989 | Lindman et al. ............... 713/166 |
| 5,959,872 | A | * | 9/1999 | Son ............................... 708/402 |
| 6,185,714 | B1 | * | 2/2001 | Satoh ............................ 714/736 |
| 2003/0043790 | A1 | * | 3/2003 | Gutierrez ...................... 370/362 |
| 2005/0114616 | A1 | * | 5/2005 | Tune et al. .................... 711/163 |
| 2005/0257016 | A1 | * | 11/2005 | Boles et al. ................... 711/163 |
| 2011/0225651 | A1 | * | 9/2011 | Villasenor et al. .............. 726/22 |
| 2012/0036299 | A1 | * | 2/2012 | Renno ........................... 710/262 |

\* cited by examiner

*Primary Examiner* — Kambiz Zand
*Assistant Examiner* — Aubrey Wyszynski
(74) *Attorney, Agent, or Firm* — Sterne, Kessler, Goldstein & Fox P.L.L.C.

(57) ABSTRACT

Systems and methods for partitioning memory into multiple secure and open regions are provided. The systems enable the security level of a given region to be determined without an increase in the time needed to determine the security level. Also, systems and methods for identifying secure access violations are disclosed. A secure trap module is provided for master devices in a system-on-chip. The secure trap module generates an interrupt when an access request for a transaction generates a security error.

20 Claims, 10 Drawing Sheets

| Region | Security Level |
|--------|---------------|
| 31 | Secure — 301a |
| 30 | Open — 301b |
| 29 | Open — 301c |
| ... | ... |
| 4 | Open — 301d |
| 3 | Secure — 301e |
| 2 | Secure — 301f |
| 1 | Open — 301g |
| 0 | Open — 301h |

Internal Scratch Memory 310

| 31 | 30 | 29 | ... | 4 | 3 | 2 | 1 | 0 |
|----|----|----|-----|---|---|---|---|---|
| 0  | 1  | 1  | ... | 1 | 0 | 0 | 1 | 1 |

Configuration Register 320

FIG. 3

| Region | Security Level |
|--------|----------------|
| 31 | Level 3 — 501a |
| 30 | Level 1 — 501b |
| ... | ... |
| 17 | Level 0 — 501c |
| 16 | Level 3 — 501d |
| 15 | Level 0 — 501e |
| 14 | Level 1 — 501f |
| ... | ... |
| 1 | Level 3 — 501g |
| 0 | Level 2 — 501h |

Internal Scratch Memory 510

Security Levels 0 0  Level 0
0 1  Level 1
1 0  Level 2
1 1  Level 3

FIG. 5 bit "0" of security level regions 31 30 29 28 ... 3 2 1 0

| 1 | 0 | 0 | 1 | ... | 1 | 1 | 1 | 1 |

Configuration Register 622

FIG. 6A bit "1" of security level regions 31 30 29 28 ... 3 2 1 0

| 1 | 1 | 1 | 0 | ... | 0 | 0 | 1 | 0 |

Configuration Register 624

METHODS OF ON-CHIP MEMORY PARTITIONING AND SECURE ACCESS VIOLATION CHECKING IN A SYSTEM-ON-CHIP

CROSS-REFERENCE TO RELATED APPLICATIONS

The present application claims the benefit of U.S. Provisional Patent Appl. No. 61/524,538, filed Aug. 17, 2011, which is incorporated herein by reference in its entirety.

BACKGROUND

1. Field of the Invention

The present invention generally relates to data and computer security.

2. Background Art

Maintaining the security of peripherals and other components in a computing environment is vital. Ensuring that non-secure components cannot access secure peripherals may be difficult as the number of components and peripherals grows. Further, identifying the reason a given access is not permitted may assist an application developer or other user in debugging.

On-chip temporary storage is often used for storage of calculations for quick access and other purposes. Temporary storage may be divided into secure and open regions. Current techniques for partitioning memory into secure and open regions are inflexible. Increasing the number of partitions in these systems results in increased latency for memory accesses.

What is therefore needed are methods and systems to support multiple interspersed secure and open memory regions without the timing penalties of existing systems.

What is further needed are methods and systems to implement secure access violation checks in a system on chip.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 3 is a diagram of a scratch memory in accordance with an embodiment.

FIG. 5 is a flow diagram of a further scratch memory method in accordance with an embodiment.

FIGS. 6A and 6B are diagrams of scratch memory configuration registers in accordance with an embodiment.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Partitioning Internal Memory

Electronic systems such as computers, wireless phones, etc. all include memory. For devices designed to handle sensitive applications or data, one or more memory units in the device is partitioned to designate a portion of the memory as secure. For example, on-chip, internal scratch memory, or RAM is often partitioned into secure regions and open regions by a memory partitioning unit. Generally, secure regions of memory can be accessed only by peripherals and devices that are identified as secure, while open regions can be accessed by both secure and non-secure peripherals and devices.

Figure 1:
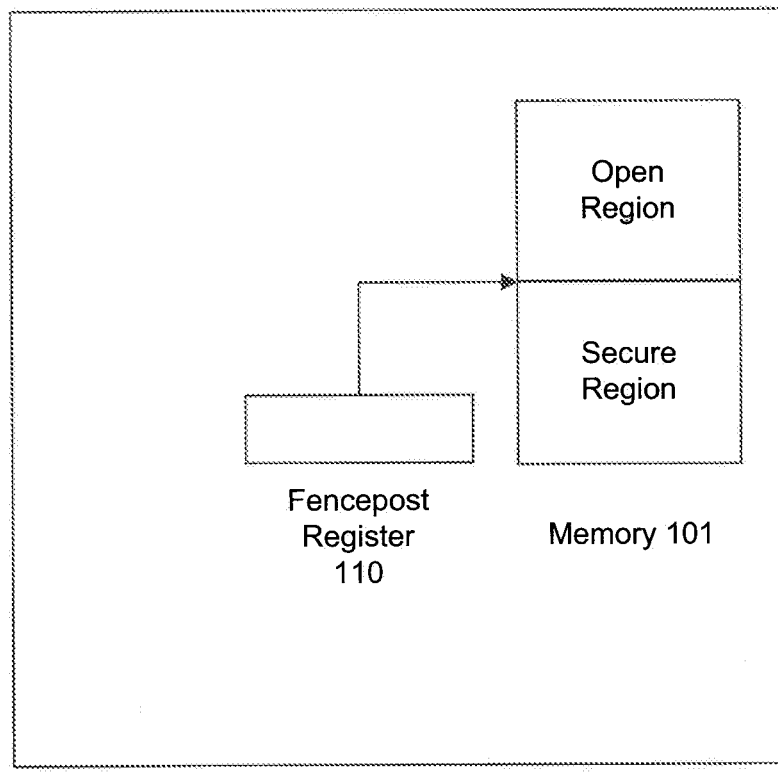
FIG. 1 is a diagram of a scratch memory partitioning system.
Figure 2:
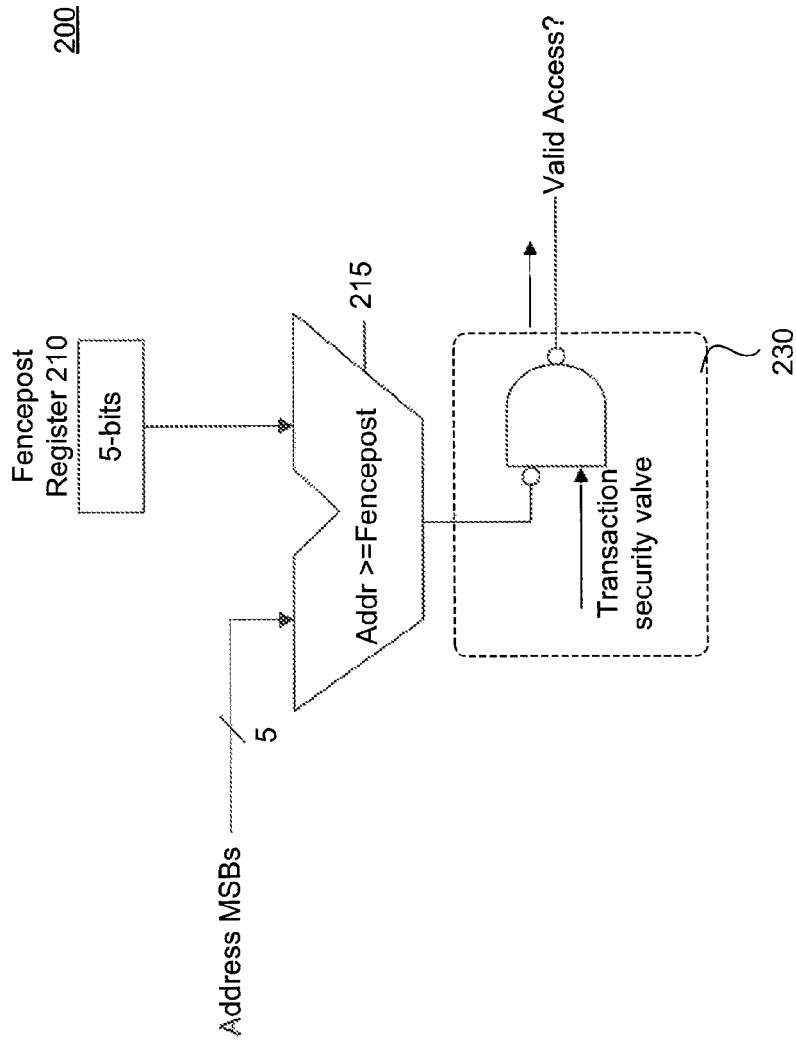
FIG. 2 is a diagram of a memory partitioning unit.

Typically, the memory partitioning unit is a fencepost register. FIG. 1 illustrates a fencepost register 110 that partitions memory 101 into a secure and an open region. The fencepost register defines the boundary between a secure memory region and an open or non-secure memory region. FIG. 2 depicts an exemplary memory partitioning unit 200 utilizing a fencepost register 210. As illustrated in FIG. 2, memory partitioning unit 200 includes an arithmetic logic unit (ALU) 215 that receives as input the value stored in the fencepost register and a portion of the memory address to be accessed (e.g., the n most significant bits of the address). The granularity of a fencepost register is typically 4 Kilobytes (KB) which is the page size of most operating systems. As illustrated in FIG. 2, the fencepost register has a granularity of 4 KB which requires a 5 bit comparison for a typical scratch memory of up to 128 KB. The five most significant bits of the memory address to be accessed are compared against the fencepost register value which represents the boundary address to determine whether the memory address is in the secure or open region. For example, a scratch memory of 128 KB may be divided into a secure region of 32 KB, and an open region of 96 KB. The fencepost register may compare a memory address to be accessed against the address of the boundary to determine whether the memory address falls within in the 32 KB secure region (e.g., is less than the boundary address), or in the 96 KB open region (e.g., is greater than the boundary address).

The resulting bit (e.g., "0" secure memory or "1" non-secure memory) is provided to a verification circuit 230 as input. As shown in FIG. 2, this bit is inverted prior to being input to the comparison circuit. Verification circuit 230 also receives an input indicating the type of memory access requested (e.g., secure or non-secure). In an embodiment, verification circuit 230 includes a NAND gate. The output of the verification circuit will indicate whether the requested access is authorized for the memory address.

One limitation of a memory partitioning unit based on fencepost registers is that only two regions of the scratch memory can be defined. If more than two regions are desired, additional fencepost registers would be necessary and more levels of logic would be required in the comparison circuit. These additional fencepost registers and logic levels increase the latency required to access memory. Partitioning the memory unit such that secure and open regions are in no particular order is not possible.

Embodiments of the present invention provide methods and systems for partitioning memory to support multiple interspersed secure and open memory regions with no extra timing penalty as experienced with prior techniques.

FIG. 3 is a diagram of a memory 310 having multiple interspersed secure and open regions, according to embodiments of the present invention. Memory 310 may be any memory unit including but not limited to internal scratch memory, on-chip memory, or RAM. As illustrated in FIG. 3, memory 301 is partitioned into multiple secure regions 301a, 301e, and 301f, and multiple open regions 301b, 301c, and 301d, and 301h. In the example of FIG. 3, memory 310 is divided into 32 distinct regions. For example, memory 310 may be a 128 KB scratch memory, partitioned into 32 four (4) KB regions. As would be appreciated by a person of skill in the art, memory 310 could be partitioned into any number of regions based on the needs of the application or system.

Each region (or partition) has an associated security level. The security level at a minimum defines whether the region (or partition) is secure or open. The security level may be used to further refine security privileges or attributes associated with the region. The number of bits used to define the security level determines the granularity that can be applied to the security level. For example, if the security level is represented by 1 bit, only two values can be defined for security such as "0" is secure and "1" is non-secure. If the security level is represented by 2 bits, four values can be defined.

Memory 310 has one or more associated configuration registers 320. The width of the configuration register is at least the number of partition regions of memory 310. For example, in the example of FIG. 3, memory 310 has 32 regions and the width of configuration register 320 is 32 bits. Each bit location in configuration register 320 is associated with a memory region (partition). For example, bit location 0 corresponds to memory partition 0, bit location 9 corresponds to memory partition 9, etc.

The value stored in the bit location of the configuration register corresponds to the security level of the associated region (partition). In the example of FIG. 3, for each secure region, configuration register 320 contains a value of 0 in the associated bit location, while for each open region, configuration register 320 contains a value of 1 in the associated bit location. The values in row 321 indicate the region which corresponds to a value in configuration register 320.

Figure 4:
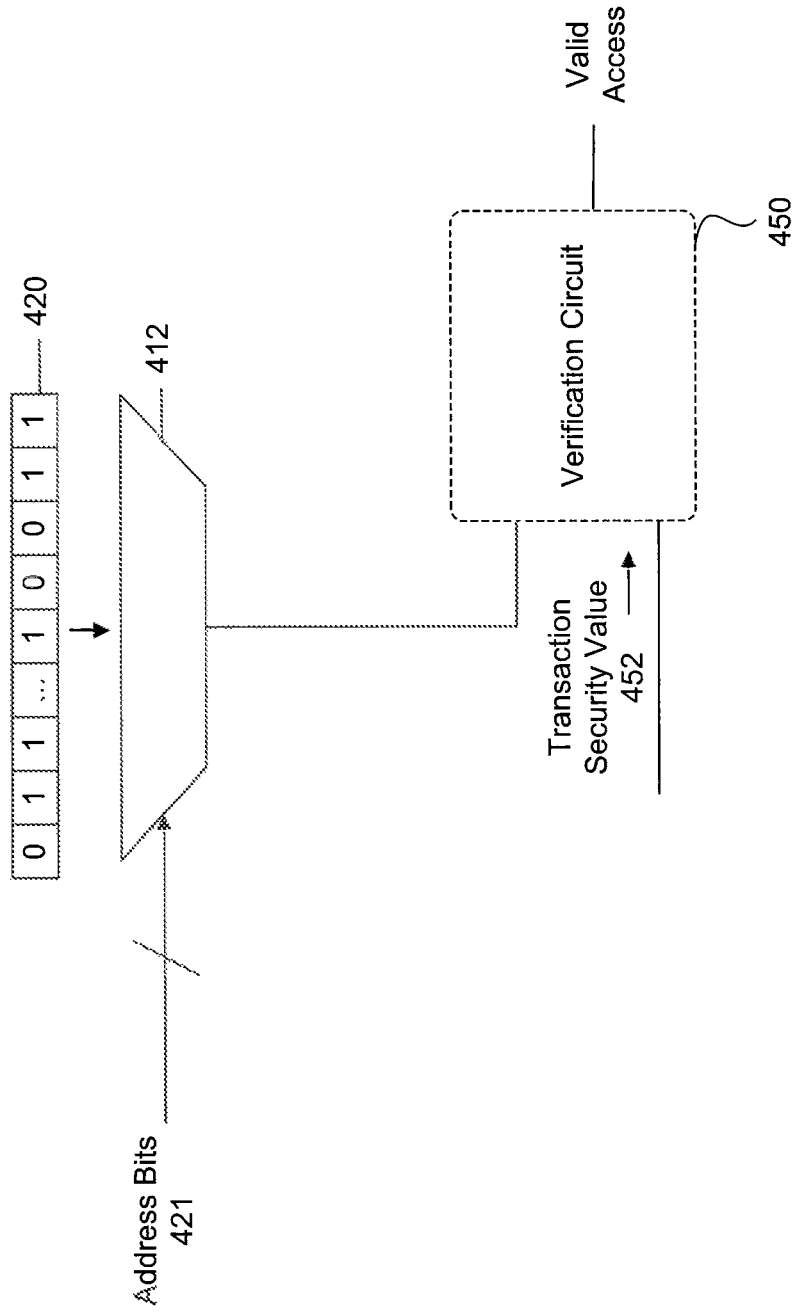
FIG. 4 is a diagram of a memory partitioning unit in accordance with an embodiment.

FIG. 4 is a block diagram of a memory partitioning unit 400, according to embodiments of the present invention. Memory partitioning unit 400 includes multiplexer 412 and a verification circuit 450. As seen in FIG. 2, all or a portion of the memory address 421 to be accessed by a transaction is used as control bits for multiplexer 412. The values stored in configuration register 420 are used as inputs to multiplexer 412. The size of the multiplexer is based on the width of the configuration register. In the example of FIG. 4, the configuration register has 32 bits, therefore multiplexer 412 is set to be a 32-to-1 multiplexer. The portion of the memory address 421 to use as the control bits is based on the number of regions (partitions). In one embodiment, the n most significant bits of the address to be accessed by the transaction are used. For example, 5 bits would be required to represent 32 memory partitions (labeled 0 to 31). In the example of FIG. 4, the 5 most significant bits of the address are used as the control bits for the multiplexer.

Multiplexer 412 outputs the value of the configuration register associated with the address identified by the control bits. The output of multiplexer 412 identifies the security level for the address to be accessed (e.g., whether the address is in a secure or open region of memory). The security level for the region to be accessed may be output to a verification circuit 450 such as an access validator circuit. Verification circuit 450 further receives the security value assigned to the memory access transaction (e.g., secure or non-secure). Based on this information and the output of multiplexer 412 the verification circuit 450 determines whether the transaction is authorized. For example, a non-secure access transaction would not be permitted to access a memory location designated as secure. If the access is permitted, a response may be transmitted to the device that originated the access request. If the access represents a violation, an error response may be transmitted to the device that originated the access request and/or a security monitor for the system. In one embodiment, if the access represents a violation, an interrupt may be generated and transmitted to a component, such as a security monitor, in the system. In a further embodiment, if the access request that represents a violation is a read access request, a pre-determined value may be generated and returned to the device that originated the access request and/or a security monitor. The pre-determined value may be used for debugging or other purposes. If the access request that represents a violation is a write access request, the request may be dropped.

As discussed above, embodiments of the present invention include a multi-bit security level. The number of bits used to represent the security level determines the number of security levels (types of memory regions) that can be applied. For example, For example, when a 2-bit security level is used, memory may be partitioned into four types of regions, each with a different security level. The use of a 3-bit security level would allow 8 types of regions (security levels) to be applied to memory. As would be appreciated by a person of skill in the art, any number of security levels can be defined for a memory, based on the needs of the system.

FIG. 5 is a diagram of such a memory 510 partitioned according to a multi-bit security level, according to embodiments of the present invention. In the exemplary embodiment of FIG. 5, a 2-bit security level is applied, resulting in 4 types of memory (security levels ranging from zero to three). Although FIG. 5 depicts a 2-bit security level, a person of skill in the art would recognize that additional bits could be used resulting in a greater number of security levels available for the system.

Memory 510 is partitioned into n regions. For ease of discussion, memory 510 of FIG. 5 is depicted as being partitioned into 32 regions. Each region of memory 510 is assigned a different type (security level). Region 501a has a security level of 3, region 501b has a security level of 2, region 501c has a security level of zero, while region 14 has a security level of 1.

The assigned security levels for each region are stored in one or more configuration registers. FIGS. 6A and B depict two alternatives for storing security level information, according to embodiments of the present invention. In the embodiment depicted in FIG. 6A, each bit of the security level is stored in a separate configuration register. In this embodiment, the number of configuration registers would equal the number of bits used to represent the security level. In the example of FIG. 6A, a 2-bit security level is used and therefore, two configuration registers are required. As illustrated in FIG. 6A, configuration register 622 stores bit "0" of the security level for each of the n (e.g., 32) memory regions. Configuration register 624 stores bit "1" of the security level for each of the n (e.g., 32) memory regions. In the embodiment depicted in FIG. 6B, the security level bits are not split between registers but instead stored in the same register. Depending on the size of the register, the size of the security level field, and the number of partitions, additional configuration registers may be required in this embodiment. As shown in the example of FIG. 6B, for a 2-bit security level, the security levels for regions 0 through 15 are stored in configuration register 626 and the security levels for regions 16 through 31 are stored in configuration register 628.

Figure 7:
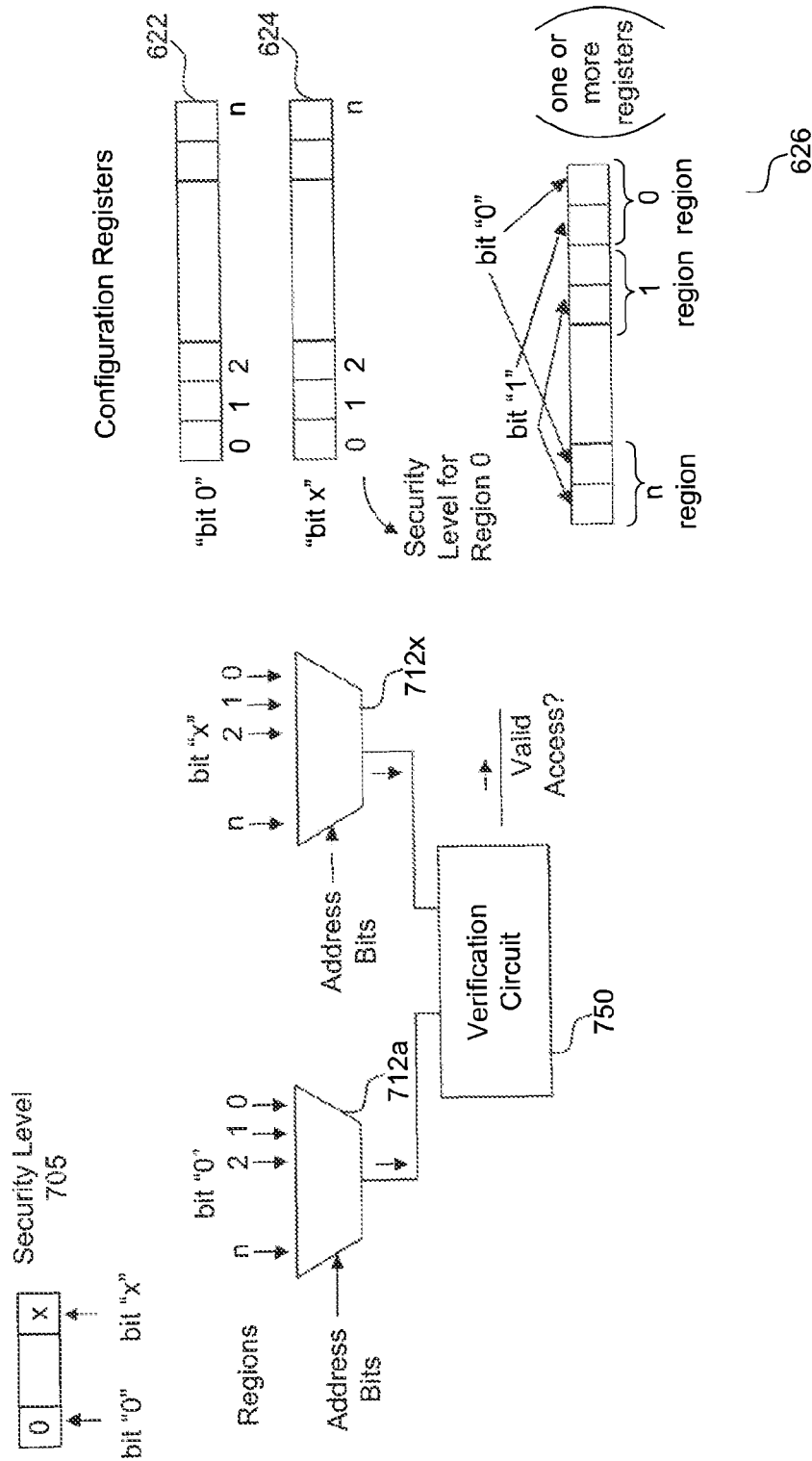
FIG. 7 is a diagram of a memory partitioning unit in accordance with an embodiment.

FIG. 7 depicts a block diagram of a memory partitioning unit 700 supporting a multi-bit security level, according to embodiments of the present invention. In the embodiment of FIG. 7, the security level 705 is represented by x bits (where x is greater than 1). Memory partitioning unit 700 includes x multiplexers 712A through 712X. The number of multiplexers required is based on the number of bits in the security level to be processed by unit 700. For example, if the security level has 2 bits (x=2), memory partitioning unit 700 would include 2 multiplexers, 712A and 712B. If the security level has 3 bits (x=3), memory partitioning unit 700 would include 3 multiplexers.

Multiplexers 712A through 712X are n-to-1 multiplexers. The size of the multiplexer, n, is based upon the number of memory regions (partitions). For example, if the memory is partitioned into 32 regions, multiplexers 712A through 712X are 32-to-1 multiplexers. Each multiplexer receives as input a bit from the security level of each memory region. For example, multiplexer 712A receives n inputs corresponding to bit "0" of the security level for each of the n regions. Multiplexer 712X receives n inputs corresponding to bit "x" of the security level for each of the n regions.

As illustrated in FIG. 7, if each security level bit is stored in a separate register 622 and 624 (as depicted in FIG. 6B), the value in the 0 position of bit "0" register 622 is provided as the 0 input to multiplexer 712A and the value in the 0 position of the bit "x" register 624 is provided as the 0 input to multiplexer 712X. Similarly, the value in the 1 position of bit "0" register 622 is provided as the 1 input to multiplexer 712A and the value in the 1 position of the bit "x" register is provided as the 1 input to multiplexer 712X, and so on. If the security level is stored in the same register for a region (as illustrated FIG. 6B), the "0" bit for that region is provided to multiplexer 712A and the "1" bit for that region is provided to multiplexer 712X.

Each of the multiplexers 712A through 712X receives a portion of the memory address to be accessed by a transaction as the control bits for the multiplexer. In an embodiment, as described above, the control bits are the m most significant bits for the address where m is based on the number of bits required to represent the number of memory regions (e.g., 32 memory regions requires 5-bits, 64 requires 6-bits, etc.). The multiplexers then select the value of the security level bit associated with the memory address to be accessed. For example, if memory address 00010xxx is being accessed, multiplexer 712A will output the input labeled 2 as the security level for bit "0" of memory address 00010xxx.

The outputs of multiplexers 712A through 712X are provided as input to a verification circuit 750. Verification circuit 750 also receives as input an indication of the security associated with the attempted memory access transaction. Verification circuit 750 then determines based on the security level of the memory address to be accessed (received from multiplexers) whether the transaction is authorized.

Figure 8:
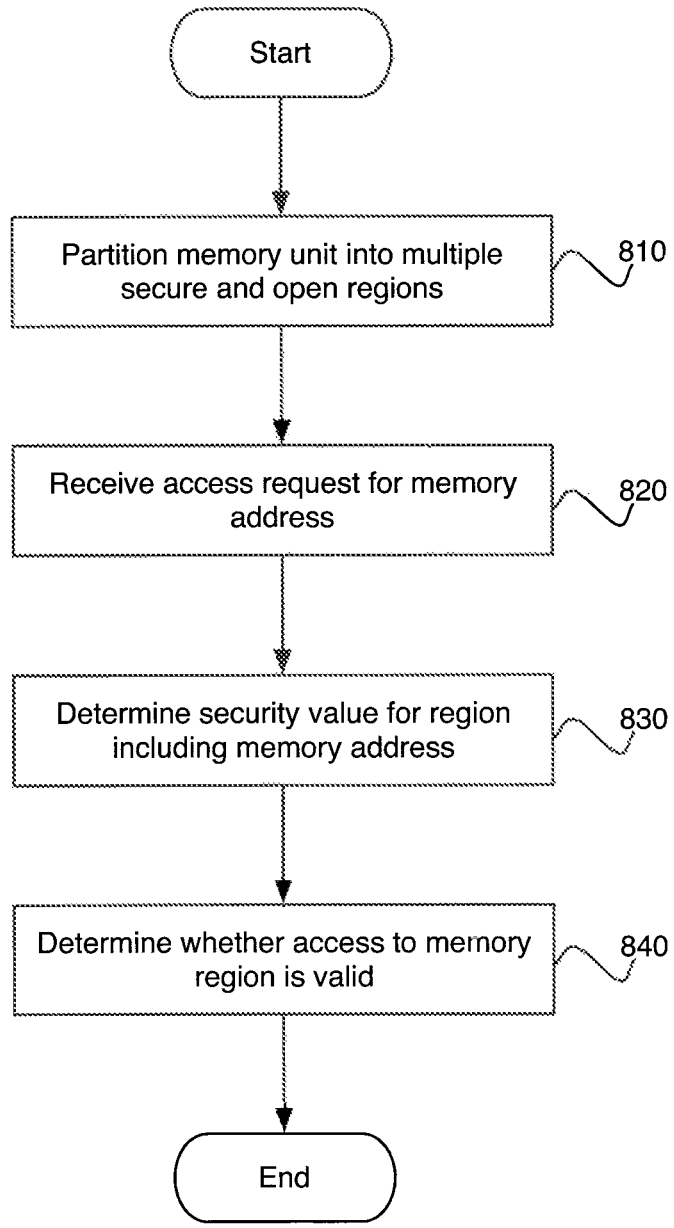
FIG. 8 is a flow diagram of a method in accordance with an embodiment.

FIG. 8 is a flow diagram of a method 800 for determining whether access to a memory address is valid, according to embodiments of the present invention. Method 800 is described with reference to the embodiments of FIGS. 3-7. However, method 800 is not limited to those embodiments.

Method 800 begins at step 810, where a memory unit, such as an internal scratch memory, is partitioned into multiple regions. In this step, each region is assigned a security level. The security level value is then stored in one or more configuration registers. For example, memory may be partitioned into 32 regions with each region having an associated 1-bit security level to indicate whether the region is secure or open.

At step 820, an access request for a memory address is received.

At step 830, the security level associated with the memory address to be accessed is determined. As discussed above, the memory address to be accessed is included in one of the regions (partitions) of the memory unit. In this step, the security level for the region containing the memory address is determined. First, the security level for each region (partition) is provided to one or more multiplexers. A portion of the memory address to be accessed is used as control bits for the multiplexer. The output of the one or more multiplexers is the security level associated with the region containing the memory address to be accessed.

At step 840, a determination is made as to whether the access request for the memory address is authorized. The determination may be made based on the identified security level for the region of the memory unit that includes the memory address and the security value for the transaction. For example, a non-secure transaction (e.g., originating from a non-secure component) may not be authorized to access an address in a secure region of memory.

In accordance with one embodiment, other types of memory can be partitioned using the techniques described herein. For example, external volatile memory, such as SDRAM, can be configured to include multiple regions with different security levels as described herein.

Secure Access Violation Checks

System-on-chip (SoC) devices integrate components of a computing device on a single chip. Such SoC devices are often used in computing devices such as mobile phones, tablet computers, and other devices. A challenge in SoC devices is to ensure that only secure master components can access secure slave components. In prior systems, management of secure access requests, for example, identifying secure access violations, is performed by a separate secure master device, such as a security aware processing device. However, as the number of master devices increases, the security aware processing device may not be suitable to manage all secure access requests.

Figure 9:
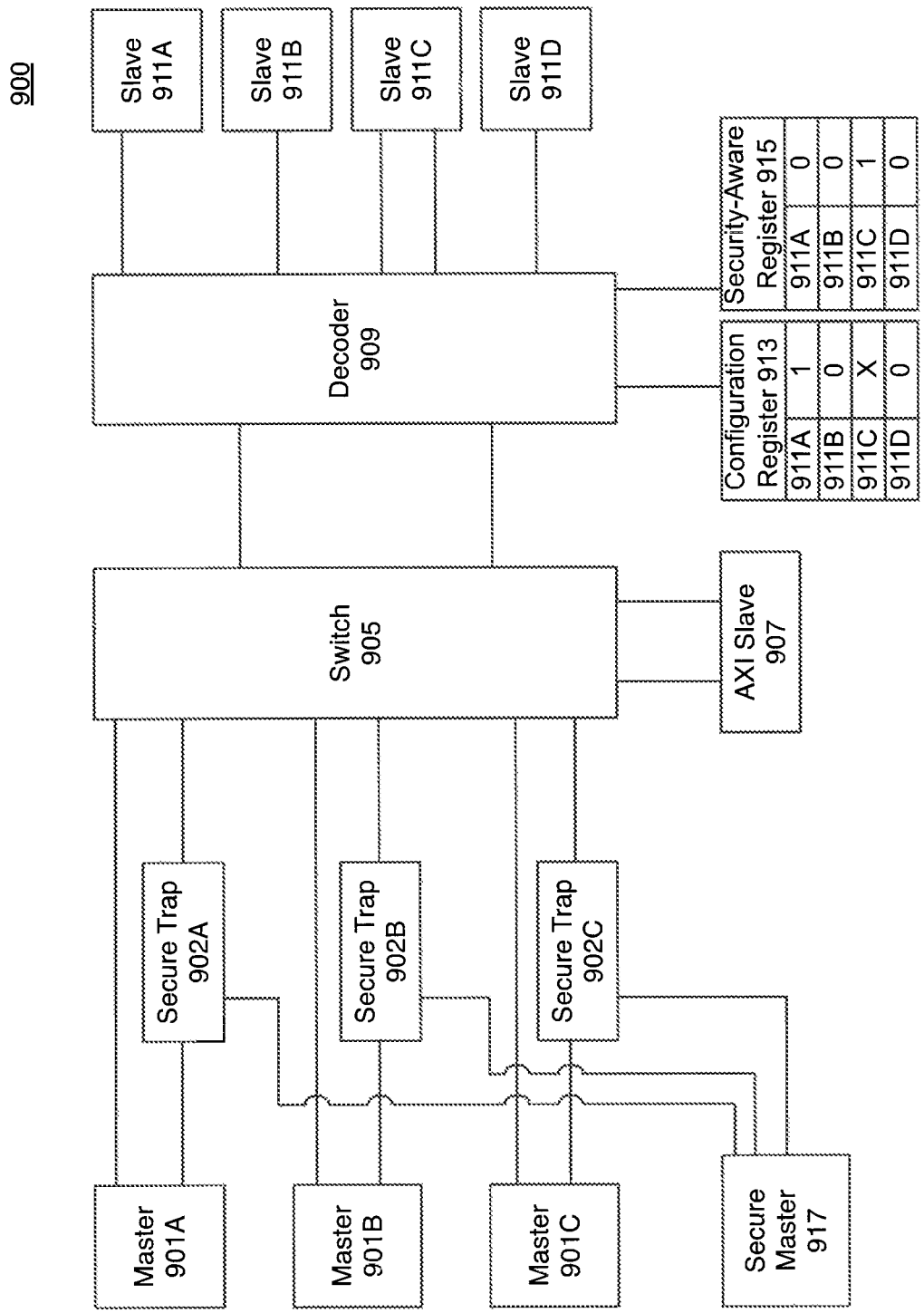
FIG. 9 is a diagram of a system in accordance with an embodiment.

FIG. 9 is a diagram of a system 900 for performing security access violation checks, according to embodiments of the present invention. System 900 may be implemented as part of a SoC device.

System 900 includes one or more master components 901A through 901N. A master may have an associated security level designation. In embodiments, the system has "n" levels of security, where n is greater than 1. For example, if n is equal to two, a master may be designated as a secure master or an open master. In this example, secure masters can access both secure and open slaves. Open masters can only access open slaves. In an embodiment, one or more masters may be capable of generating both secure and non-secure transactions based on the level of virtualization in their software. Masters may be, in one embodiment, Advanced eXtensible Interface (AXI) transaction masters in an ARM architecture. Other architectures are possible as well, as will be known to those of skill in the art.

System 900 may further include one or more slaves 907 and 911A through 911N. In embodiments, slaves are peripherals such as network interfaces or interfaces to other devices. A slave may be designated as one of two types. Slaves may be designated as security-aware or non-security-aware. A security-aware slave implements its own security. Non-security-aware slaves may rely on another component, such as a decoder, to implement security checks for the slave.

Like masters, each slave has an associated security level. As described above with reference to masters, "n" security levels for slaves are possible, where n is greater than 1. For example, if the system supports two levels of security, the slaves may have a security level of secure or open. In this example, a secure slave is accessible only by secure masters in the system. The whole address range of the secure slave is configured as secure. An open slave is accessible by both secure and open masters. The whole address range of the peripheral is configured as open.

Slaves 911A through 911N are coupled to decoder 909 which performs security checks for the one or more of the slaves that are not security aware. In embodiments, slaves 911A through 911N may be advanced peripheral bus (APB) slaves or advanced high-performance bus (AHB) slaves. One or more slaves 907 or 911N are security aware. In security aware slaves, security checks are performed by the slaves.

Masters 901 generate requests to access slaves. Each master device 901 is associated with a secure trap module 902. For example, each of master 901A through 901N is associated with a secure trap module 902A through 902N. Secure trap modules are configured to capture responses returned as a result of an access request. A secure trap module 902 includes a transaction FIFO buffer, one or more registers and a bus to access the registers. In an embodiment, registers include a configuration register and one or more status registers. A status register is configured to capture the ID, address and access type of a request.

The transaction FIFO buffer may store information for all outstanding transactions, and may log characteristics for transactions. A secure trap module 902 may use the FIFO transaction buffer to determine which access request from a master device 901 generated a particular security response. For example, secure trap module 902 may be configured to add to the transaction FIFO for each address request and match the incoming response direction and ID to a FIFO entry to remove the entry. When a violation response is detected, the secure trap module 902 is configured to copy the entry information into a status register. The secure trap module 902 may also be configured to generate an interrupt or send an error response back to the master after detecting a violation, as described in more detail below.

Each master device 901 and secure trap module 902 are coupled to a switch 905, such as an AXI switch. Switch 905 is configured to route access requests and responses to appropriate destinations. For example, switch 905 may route access requests for ARM peripheral bus (APB) slaves to decoder 909. Decoder 909 may be, in one embodiment, an AXI2APB decoder. Such a decoder 909 may allow AXI components to communicate with APB component. In one embodiment, system 900 may also include ARM High-performance bus (AHB) slaves and a corresponding AXI2AHB decoder. Switch 905 may also route access requests for security aware slaves (such as slave 907) to the slave. System 900 may include more than one switch 905.

Decoder 909 may be coupled to any number of slaves 911A through 911N. In one embodiment, a register, such as a secure configuration register 913, may assist decoder 909 in determining whether a particular slave 911 is secure or open. For example, a value of 0 in configuration register 913 may indicate that a slave is secure. Correspondingly, a value of 1 in configuration register 913 may indicate that a slave is open, and a value of X may indicate that the slave is security aware. In one embodiment, the bits set in secure configuration register 913 are one-way lockable bits, and cannot be changed until system 900 is reset.

Decoder 909 receives access requests for slaves 911A through N from masters 901. Using information from secure configuration register 913, decoder 909 determines whether a particular access request is intended for a non-security-aware slave (e.g. a secure slave or an open slave), or a security-aware slave.

Decoder 909 is configured to perform a security check on received access requests for slaves that are not security aware. The access request for a transaction includes information indicating whether the master device 901 sending the access request is a secure or open master. For example, if the access request is from a secure master, and the intended slave is a secure or open slave, the access is permitted and decoder 909 may return an OK security response. If the access request is from an open master, and the intended slave is an open slave, the access may also be permitted, and decoder 909 may return an OK security response. If the transaction access request is from an open master and the intended slave is a secure slave, the access is denied and decoder 909 returns a violation security response. In one embodiment, read access requests that indicate security access violations may be returned with a pre-determined value as a violation signature. Write access requests that indicate security access violations may be dropped so that the master is not affected.

Secure trap module 902 is configured to monitor responses watching for security violation responses. In one embodiment, the security response received at a secure trap module 902 indicates whether the intended access for the transaction was a read access or a write access. In a further embodiment, response codes may indicate whether an access violation is a security access violation or another type of access error.

If the security response is an OK security response, secure trap module 902 passes the response to the master. If the security response indicates a violation, the secure trap module 902 for the master takes appropriate action. For example, if a read access request generates a security access violation, an error code may be transmitted to the master associated with the access request. Such an error code may signify that the response does not include valid data. In an embodiment, secure trap module 902 generates an interrupt using the configuration register. For example, if a write access request indicates a security access violation, the secure trap module may simply drop the response after transmitting the interrupt.

In one embodiment, the interrupt may be communicated to a secure master 917, such as an application processor in an ARM architecture. The application processor may have full control over security-related functions for the system. Secure master 917 may include processing logic to take further action if a secure interrupt is generated.

System 900 may include a second register, such as a security aware configuration register 915, that is configured to assist decoder 909 in determining whether a particular slave device is security aware. If a slave device is security aware, such as security aware slave device 911N, the slave device itself may determine whether a given access request for the slave device for a transaction is permitted. The security-aware slave device may then generate a response for the access (i.e. OK or violation), and pass this response to the decoder 909 which in turn communicates the response to switch 905, as detailed above. In one embodiment, AXI slave devices, such as AXE slave 907, are always security aware, and generate security responses for access requests.

Figure 10:
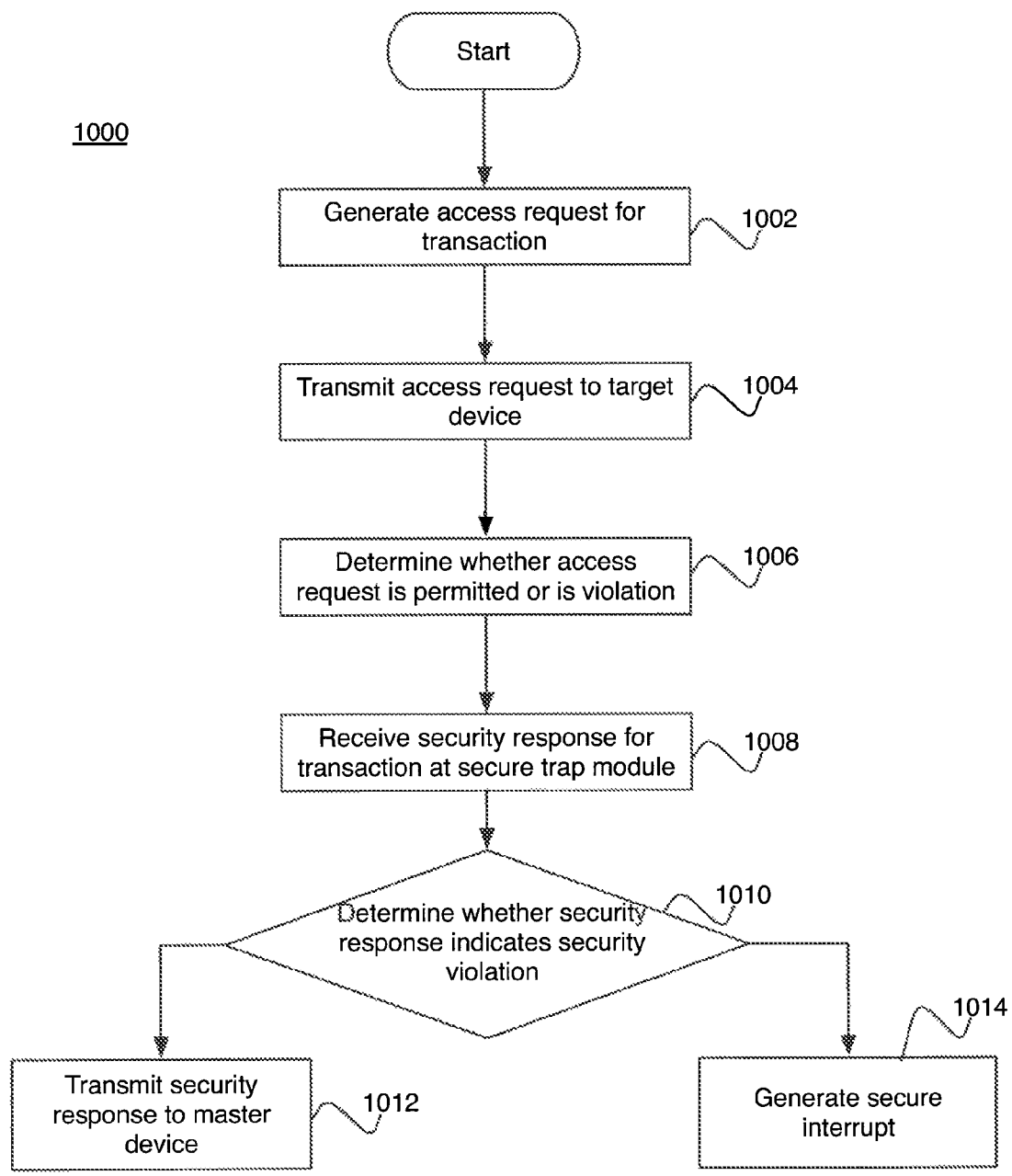
FIG. 10 is a flow diagram of a further method in accordance with an embodiment.

FIG. 10 is a flow diagram of a method 1000 for identifying a security violation in a system-on-chip, according to embodiments of the present invention. Method 1000 is described with reference to the embodiment of FIG. 9. However, method 1000 is not limited to that embodiment.

Method 1000 begins at step 1002, where a master generates an access request. The access request indicates a slave to be accessed, and also indicates whether the master is secure or open.

At step 1004, the access request is transmitted to a target such as decoder 909 or a security aware slave. For example, if the request is for a slave that is not security aware, the request is provided to decoder 909. If the request is for a security aware slave, the request will be sent to the slave either directly (e.g., slave 907) or via decoder 909.

At step 1006, the target determines whether the access request is authorized, based on whether the master is secure or open, and whether the slave to be accessed is secure or open. In embodiments, additional factors and information may be used to make this determination. The target may generate and communicate an appropriate security response.

At step 1008, a secure trap module receives the response associated with the request.

At decision block 1010, the secure trap module determines whether the response indicates a security violation, or whether the security response indicates a permitted access. If the security response indicates a permitted access, method 1000 proceeds to step 1012, where the response is transmitted to the master device. If the response indicates a security violation, method 1000 proceeds to step 1014, where a secure interrupt is generated. For example, secure trap module may generate a secure interrupt, and transmit the secure interrupt to a secure master device.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A device having on-chip secure access violation checking, comprising:
    a plurality of slave components;
    a plurality of master components, wherein each master component is configured to send an access request to a slave component in the plurality of slave components;
    a decoder coupled to a first set of slave components, configured to:
        determine whether a request from a master component in the plurality of master components for a slave component in the first set of slave components is a valid request, and
    communicate a response based on the determination; and
    a plurality of secure trap modules, each of the secure trap modules coupled to a different master component in the plurality of master components, each secure trap module configured to:
        log a request from an associated master component for a slave component,
        monitor for a response from the slave component to the request, and
        generate an interrupt when the response indicates a security violation.

2. The device of claim 1, further comprising:
    a set of security aware slave components coupled to the decoder, each security aware slave component configured to:
        determine whether a request from a given master component is a valid request;
        generate a response based on the determination; and
        communicate the response to the decoder.

3. The device of claim 1, wherein each slave component in the first set of slave components has an associated level of security.

4. The device of claim 3, wherein the associated level of security is locked until a system reset.

5. The device of claim 3, wherein the system supports n levels of security, where n is greater than 1.

6. The device of claim 3, further comprising a register coupled to the decoder configured to store the status of each slave component in the first set of slave components.

7. The device of claim 2, further comprising a register configured to store an identification of the set of security aware slave components.

8. The device of claim 1, further comprising a switch coupled to the plurality of master components and the plurality of secure trap modules.

9. The device of claim 8, further comprising:
    a slave component coupled to the switch, wherein the slave component is configured to receive an access request from a master component in the plurality of master components, generate a response based on the determination, and communicate the response to the switch.

10. A method for performing secure access checking in a system on chip, comprising:
    transmitting, from a master component, an access request for a slave component;
    logging, at a secure trap module coupled to the master component, the access request;

receiving at the secure trap module a response to the request, wherein the response identifies whether the access request for the slave component is valid; and generating, by the secure trap module, a secure interrupt when the security response identifies that the access request represents a violation.

11. The method of claim 10, further comprising:

transmitting, by the secure trap module, the secure interrupt to a secure master.

12. A system for determining, for a transaction, the validity of an access request for a memory address, comprising:
- a memory partitioned into a plurality of regions, wherein each region is associated with a security level;
- a memory partitioning circuit coupled to the memory, including:
  - a multiplexer, wherein the multiplexer is configured to receive the security level for each region as inputs and a portion of a memory address as control bits and output a security value for a region containing the memory address; and
- a verification circuit coupled to the memory partitioning circuit, the verification circuit configured to:
  - receive the output of the multiplexer,
  - receive a transaction security value for the access request for the memory address, and
  - determine whether the access request for the memory address is valid, based on the security value for the region and the transaction security value for the access request for the memory address.

13. The system of claim 12, wherein each memory region has a predetermined size.

14. The system of claim 12, wherein the memory is partitioned into n regions.

15. The system of claim 14, wherein the multiplexer is an n-to-1 multiplexer.

16. The system of claim 12, wherein the security level is n bits, where n is greater than 1.

17. The system of claim 16, further comprising an additional n-1 multiplexers, wherein each of the multiplexers is configured to receive a bit of the security level for each of the plurality of regions.

18. The system of claim 12, wherein the verification circuit is configured to determine whether the access request for the memory address is valid by comparing the transaction security value for the access request for the memory address to the security value for the region.

19. The system of claim 12, wherein the verification circuit is further configured to generate an interrupt when the access request for the memory address is not valid.

20. The system of claim 12, wherein the verification circuit is further configured to block access to the memory when the access request for the memory address is not valid.

* * * * *